(12) United States Patent
Chen

(10) Patent No.: US 9,457,454 B2
(45) Date of Patent: Oct. 4, 2016

(54) HYDRAULIC HYDROSTATIC PRESSURE ROTATION MODULE

(71) Applicant: Industrial Technology Research Institute, Hsin-Chu (TW)

(72) Inventor: Shang-Te Chen, Taichung (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 83 days.

(21) Appl. No.: 14/583,399

(22) Filed: Dec. 26, 2014

(65) Prior Publication Data

US 2016/0144489 A1 May 26, 2016

(30) Foreign Application Priority Data

Nov. 21, 2014 (TW) .............................. 103140488 A

(51) Int. Cl.
 *F16C 32/06* (2006.01)
 *B25B 11/00* (2006.01)
(52) U.S. Cl.
 CPC ........... *B25B 11/00* (2013.01); *F16C 32/0651* (2013.01); *F16C 32/0662* (2013.01)
(58) Field of Classification Search
 CPC . F16C 32/0662; F16C 32/0696; F16C 33/06
 See application file for complete search history.

(56) References Cited

U.S. PATENT DOCUMENTS

| | | | | |
|---|---|---|---|---|
| 3,518,899 A | * | 7/1970 | Greenberg | G05B 19/351 74/816 |
| 3,934,948 A | * | 1/1976 | Pruvot | F16C 32/0648 384/111 |
| 4,568,203 A | * | 2/1986 | Eddy | G02B 26/121 384/121 |
| 4,794,289 A | * | 12/1988 | Barnaby | B23Q 1/38 310/268 |
| 5,599,108 A | * | 2/1997 | Ochiai | B23Q 1/265 384/123 |
| 6,142,672 A | | 11/2000 | Bently et al. | |

(Continued)

FOREIGN PATENT DOCUMENTS

| | | |
|---|---|---|
| CN | 201799863 U | 4/2011 |
| CN | 103770364 | 5/2014 |

(Continued)

OTHER PUBLICATIONS

Hydrostatic Systems in Machine Tools, "Hydrostatic PM Controller Contributes to Accuracyof Machining Operations and Machine Service Life", Transatlantic Connection, Inc. Rockford, IL, Aug. 2002.

(Continued)

*Primary Examiner* — Thomas R. Hannon
(74) *Attorney, Agent, or Firm* — WPAT, PC; Justin King

(57) ABSTRACT

A hydraulic hydrostatic pressure rotation module has a table piece with a mount face; an oil cavity piece installed on the mount face, having at least one first oil cavity, at least one second oil cavity, at least one third oil cavity, at least one first oil way communicated with the first oil cavity, at least one second oil way communicated with the second oil cavity and the first oil way, at least one third oil way communicated with the third oil cavity and the second oil way, and at least one fourth oil way communicated with the second oil way; a supporting oil seat installed on a face of the oil cavity piece away from the mount face, having at least one oil entry way communicated with the fourth oil way; a spindle through the supporting oil seat and the oil cavity piece and coupled to the table piece.

8 Claims, 5 Drawing Sheets

(56) References Cited

U.S. PATENT DOCUMENTS

| | | | | |
|---|---|---|---|---|
| 6,419,396 | B1* | 7/2002 | Raess | B23Q 1/70 384/107 |
| 8,333,512 | B2 | 12/2012 | Huang et al. | |
| 2005/0269868 | A1* | 12/2005 | Kawai | F16C 32/064 303/2 |

FOREIGN PATENT DOCUMENTS

| | | |
|---|---|---|
| DE | 3150117 A1 | 7/1983 |
| DE | 10260000 A1 | 7/2004 |
| GB | 1400966 A | 7/1975 |
| JP | 05-023936 | 2/1993 |
| JP | 2005007532 A | 1/2005 |
| JP | 2010124565 | 6/2010 |
| JP | 4696951 B2 | 6/2011 |
| KR | 20070066686 A | 6/2007 |
| KR | 20100083753 | 7/2010 |
| TW | 201040406 | 11/2010 |
| TW | M417221 | 12/2011 |
| TW | 201219149 A | 5/2012 |
| TW | M437759 | 9/2012 |
| TW | I407023 | 9/2013 |
| TW | I435985 | 5/2014 |
| TW | I449593 | 8/2014 |

OTHER PUBLICATIONS

Alexander H. Slocum, "Water hydrostatic bearings for precisionmachine tool and industry machinery", Department of Mechanical Engineering Massachusetts Institute of Technology, Cambridge, MA, USA 02139, 2007.

Schönfeld GmbH, "Hydrostatic linear and round bearings", Hyprostatik. Transatlantic Connection, Inc. Rockford, IL.

Christoph Brunner, "Design of linear hydrostatic bearings", Massachusetts Institute of Technology, Dec. 1993.

R. Bassani, B. Piccigallo, "Hydrostatic bearings", Hydrostatic Lubrication, Elsevier Science Publisher B.V. Amsterdam, The Netherlands, 1992.

N.R. Kane, J. Sihler, A.H Slocum, "A hydrostatic rotary bearing with angled surface self-compensation", Department of Mechanical Engineering, Massachusetts Institute of Technology, Cambridge, MA, USA. Precision Engineering 27 (2003) 125-139.

Taiwan Intellectual Property Office, "Office Action", issued on Apr. 26, 2016.

* cited by examiner

HYDRAULIC HYDROSTATIC PRESSURE ROTATION MODULE

CROSS REFERENCE TO RELATED APPLICATION

This application also claims priority to Taiwan Patent Application No. 103140488 filed in the Taiwan Patent Office on Nov. 21, 2014, the entire content of which is incorporated herein by reference.

TECHNICAL FIELD

The present disclosure relates to a hydraulic hydrostatic pressure rotation module, and more particularly, to a hydraulic hydrostatic pressure rotation module capable of providing a rigidity and a precision.

BACKGROUND

Hydraulic hydrostatic pressure rotation modules are mainly used in applications and machinery of high working loads, high speeds, and high precision requirements. Thus, as hydraulic hydrostatic pressure rotation modules are advantageous in their high precision and high loading capacity, they are now generally used in machine tool industry.

However, the preciseness of a hydraulic hydrostatic pressure rotation module is represented in its superiority in axial precision and radial precision. Nevertheless, the axial precision adjustment and the radial precision adjustment in conventional methods are governed by different systems, so that it can be very expensive to achieve the required precision. Consequently, it is in need of a low-cost high-precision hydraulic hydrostatic pressure rotation module capable of integrating axial precision adjustment and radial precision adjustment.

SUMMARY

The present disclosure provides a hydraulic hydrostatic pressure rotation module, comprising:
  a table piece, formed with a mount face;
  an oil cavity piece, installed on the mount face, while being formed with at least one first oil cavity, a through hole, at least one second oil cavity, at least one third oil cavity, at least one first oil way, at least one second oil way, at least one third oil way and at least one fourth oil way in a manner that the at least one first oil cavity is disposed on a face of the oil cavity piece that is facing toward mount face, the at least one second oil cavity is disposed on the inner wall of the through hole, the at least one third oil cavity is disposed on a face of the oil cavity piece that is not facing toward the mount face, while allowing the first oil way to be arranged in communication with the first oil cavity, the second oil way to be arranged in communication with the second oil cavity and the first oil way, the third oil way to be arranged in communication with the third oil cavity and the second oil way, and the fourth oil way to be arranged in communication with the second oil way;
  a supporting oil seat, installed on a face of the oil cavity piece that is not facing toward the mount face, being formed with at least one oil entry way in a manner that the oil entry way is disposed in communication with the fourth oil way; and
  a spindle, disposed passing through the supporting oil seat and the through hole of the oil cavity piece while coupling to the table piece.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
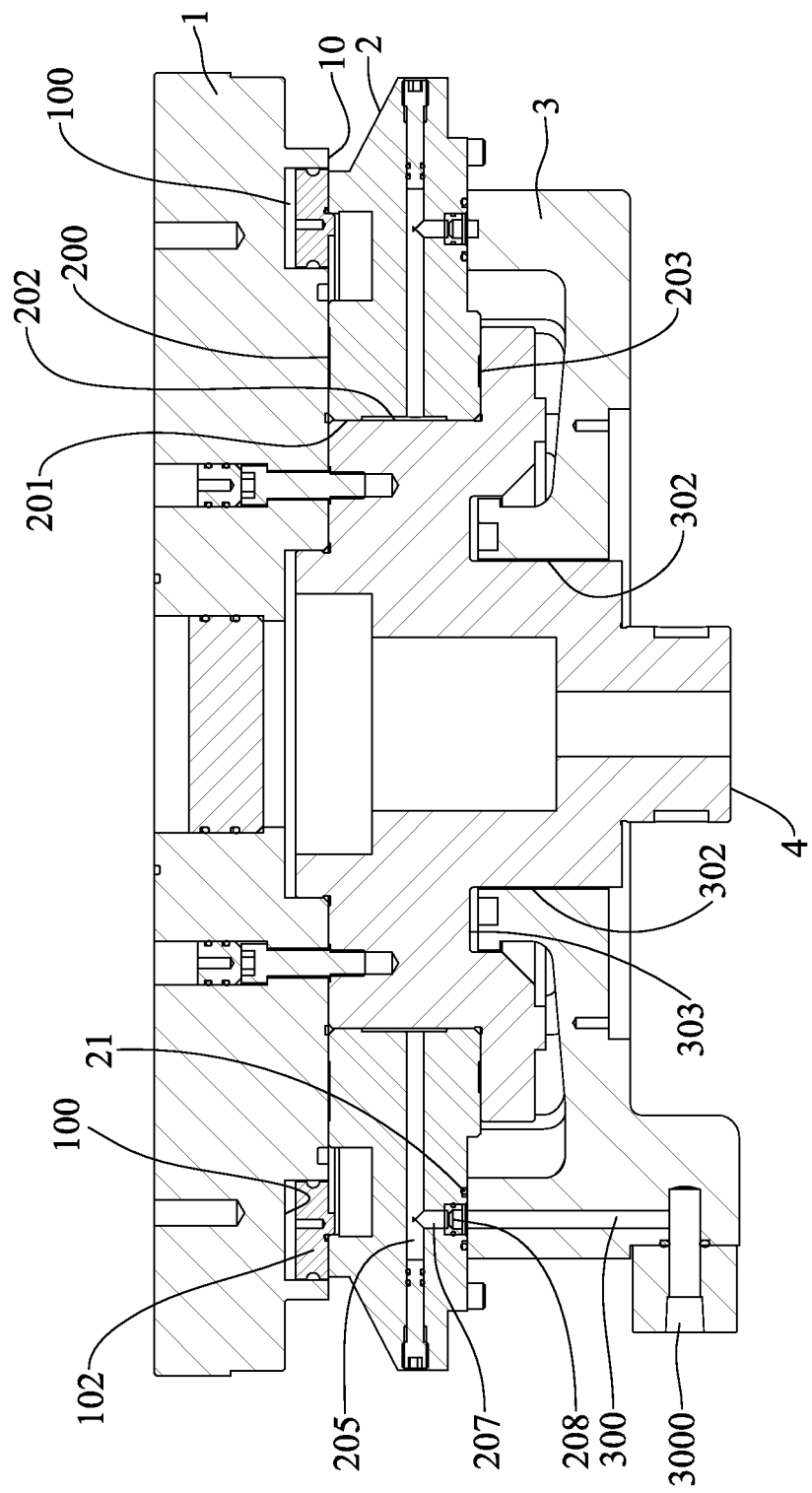
FIG. 1 is a sectional view of a hydraulic hydrostatic pressure rotation module according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Please refer to FIG. 1, which is a sectional view of a hydraulic hydrostatic pressure rotation module according to an embodiment of the present disclosure. As shown in FIG. 1, the hydraulic hydrostatic pressure rotation module comprises: a table piece 1, an oil cavity piece 2, a supporting oil seat 3 and a spindle 4.

Figure 4:
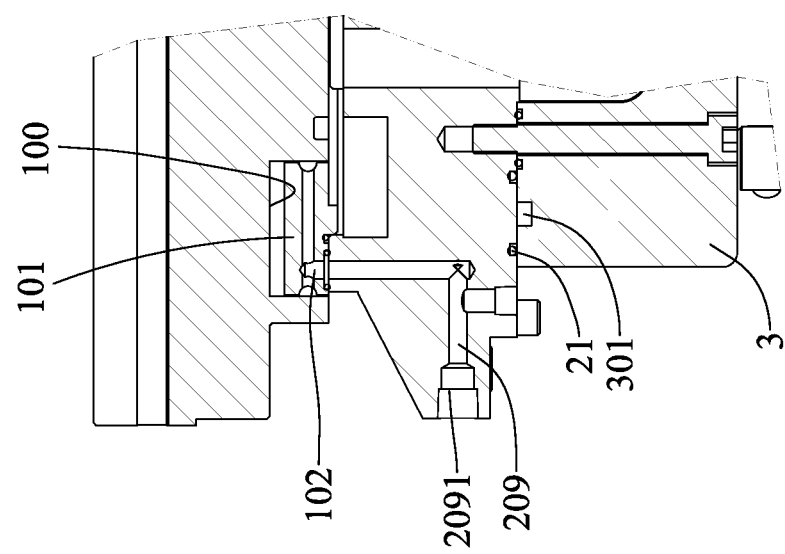
FIG. 4 is further another partial schematic view of a hydraulic hydrostatic pressure rotation module according to an embodiment of the present disclosure.

The table piece 1 is formed with a mount face 10, whereas the mount face 10 is further formed with a labyrinth interface 100 and at least one oil return block 101. The labyrinth interface 100 is disposed at a position neighboring to the periphery of the mount face 10. Each of the at least one oil return block 101 is disposed in the labyrinth interface 100 while allowing each oil return block 101 to be spaced from the inner wall of the labyrinth interface 100 by a specific gap, whereas the specific gap can be ranged between 0.3 mm to 0.6 mm. In an embodiment of the present disclosure, the specific gap is defined to be 0.5 mm, but is not limited thereby. The arrangement of the labyrinth interface 100 and the oil return block 101 is used for oil leakage prevention, while the design of the specific gap is used for preventing dirt from entering into the hydraulic hydrostatic pressure rotation module. Please refer to FIG. 4, which is further another partial schematic view of a hydraulic hydrostatic pressure rotation module according to an embodiment of the present disclosure. In FIG. 4, each oil return block 101 is further formed with an oil way 102 that is arranged in communication with the labyrinth interface 100.

The oil cavity piece 2 is disposed adhering to the mount face 10 of the table piece 1, whereas the oil cavity piece 2, comprise: at least one first oil cavity 200, disposed on a face of the oil cavity piece 2 that is facing toward the mount face 10; a through hole 201, formed at the center of the oil cavity piece 2; at least one second oil cavity 202, disposed on the inner wall of the through hole 201; and at least one third oil cavity 203, disposed on a face of the oil cavity piece 2 that is not facing toward the mount face 10.

Figure 2:
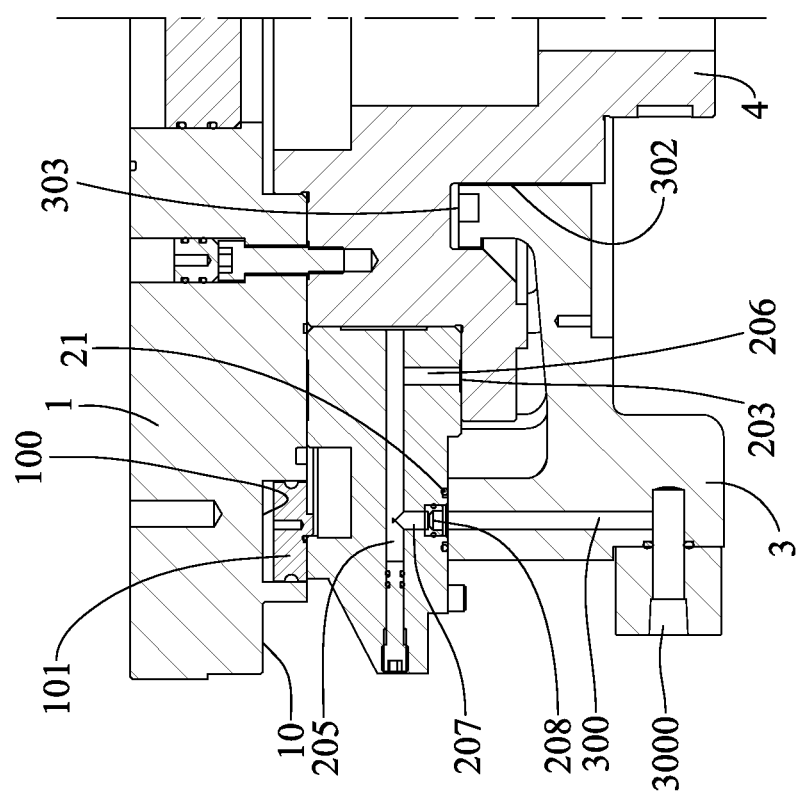
FIG. 2 is a partial schematic view of a hydraulic hydrostatic pressure rotation module according to an embodiment of the present disclosure.
Figure 3:
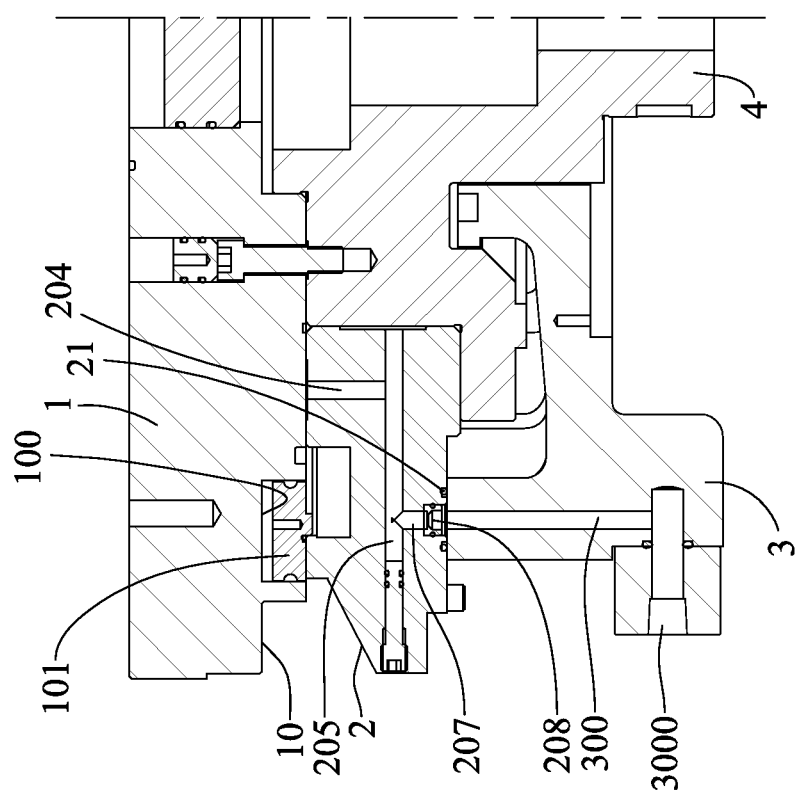
FIG. 3 is another partial schematic view of a hydraulic hydrostatic pressure rotation module according to an embodiment of the present disclosure.

As shown in FIG. 2 and FIG. 3, the oil cavity piece 2 is further formed with at least one first oil way 204, at least one second oil way 205, at least one third oil way 206, at least one fourth oil way 207 and at least one restrictor 208 in a manner that the first oil way 204 is arranged in communication with the first oil cavity 200, the second oil way 205 is arranged in communication with the second oil cavity 202 and the first oil way 204, the third oil way 206 is arranged in communication with the third oil cavity 203 and the second oil way 205, the fourth oil way 207 is arranged in communication with the second oil way 205, and the at least one restrictor 208 is disposed in the fourth oil way 207.

Figure 5:
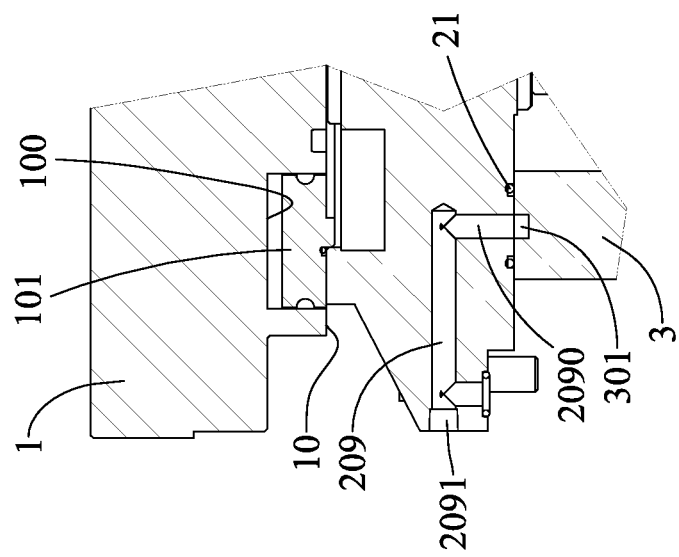
FIG. 5 is yet another partial schematic view of a hydraulic hydrostatic pressure rotation module according to an embodiment of the present disclosure.

As shown in FIG. 4 and FIG. 5, the oil cavity piece 2 is further formed with at least one first oil exit way 209 and at least one second oil exit way 2090 in a manner that each first oil exit way 209 is arranged in communication with the oil way 102 and is formed with at least one oil exit hole 2091, while each second oil exit way 2090 is arranged in communication with the first oil exit way 209.

Moreover, there are two oil seal rings 21 that are arranged at a face of the oil cavity piece 2 that is not facing toward the mount face 10 while allowing the at least one restrictor 208 to be positioned between the two oil seal rings 21.

The supporting oil seat 3 is formed with at least one oil entry way 300, a ring groove 301, a mounting hole 302 and at least one labyrinth interface 303, whereas the supporting oil seat 3 is installed on a face of the oil cavity piece that is not facing toward the mount face 10.

As shown in FIG. 4, each oil entry way 300 is arranged at a position corresponding to each restrictor 208; and each oil entry way 300 is formed with an oil entry hole 3000. In addition, the at least one ring groove 301 is disposed on a face of the supporting oil seat 300 that is facing toward the oil cavity piece 2 and at a position neighboring to the at least one oil entry way 300 while allowing the ring groove 301 to be arranged in communication with the at least one second oil exit way 2090.

It is noted that the mount hole 302 is disposed at the center of the supporting oil seat 3 at a position corresponding to the through hole 201, and the labyrinth interface 300 is disposed on a face of the supporting oil seat 3 that is facing toward the oil cavity piece 2 at a position neighboring to the mount hole 302.

As shown in FIG. 1, one end of the spindle 4 is arranged boring through the mount hole 302 and the through hole 201 so as to be coupled to the table piece 1, while allowing another end of the spindle 4 to coupled to a device selected from the group consisting of: a pulley, a direct drive motor module, and an optical ruler unit.

As shown in FIG. 1 to FIG. 4, the oil entry hole 3000 is connected to an oil supply system for allowing the oil supply system to provide a hydraulic drive oil to the supporting oil seat 3 in a manner that the hydraulic drive oil can be fed into the oil way 300 via the oil entry hole 3000. As the spindle 4 is being brought along to rotate by a pulley or a direct drive motor module, the table piece 1 is being driven to move by the rotation of the spindle 4. It is noted that the table piece 1 can be replaced and changed at will according to actual requirement.

The restrictor 208 is used for controlling the amount of hydraulic drive oil flowing into the fourth oil way 207 from the oil entry way 300. After flowing into the fourth oil way 207, the hydraulic drive oil is guided to flow sequentially through the first oil way 204, the second oil way 205 and the third oil way 206 so as to be fed respectively into the first oil cavity 200, the second oil cavity 202 and the third oil cavity 203. Thereby, each of the first, the second and the third oil cavities 200, 202, 203 that are filled with the hydraulic drive oil is able to provide a supporting force to the spindle 4, the table piece 1 and the oil cavity piece 2, whereas in response to the supporting force, a rigidity and a precision are generated.

In FIG. 1 and FIG. 4, the arrangement of the labyrinth interface 100 and the oil return block 101 that are arranged at position between the table piece 1 and the oil cavity piece 2 is used for oil leakage prevention, while the design of the specific gap is used for preventing dirt from entering into and jammed between the table piece 1 and the oil cavity piece 2. Moreover, by the communicating between the oil way 102 and the first oil exit way 209, the hydraulic drive oil can be guided to flow back to the oil supply system via the oil exit hole 2091.

As shown in FIG. 5, if there is any hydraulic drive oil overflowing out of the oil entry way 300, the overflowing hydraulic drive oil will be guided to flow into the ring groove 301 where it is being guided to flow back into the oil supply system via the second oil exit way 2090, the first oil exit way 209 and the oil exit hole 2091.

In addition, the labyrinth interface 303 is arranged at a position between the supporting oil seat 3 and the spindle 4 is used for preventing the device coupled to the spindle 4, such as a pulley, a direct drive motor module, or an optical ruler unit, from being contaminated by the hydraulic drive oil.

To sum up, the aforesaid labyrinth interface 100, 303 are used for keeping the hydraulic drive oil inside the hydraulic hydrostatic pressure rotation module, so as to prevent oil leakage, especially in a condition when the hydraulic drive oil flowing inside the first oil cavity 200, the second oil cavity 202 and the third oil cavity 203 is overflowed. Moreover, each of the first, the second and the third oil cavities 200, 202, 203 that are filled with the hydraulic drive oil is able to provide a supporting force to the spindle 4, the table piece 1 and the oil cavity piece 2, whereas in response to the supporting force, a precision is generated in two respects, i.e. axial precision and radial precision.

The aforesaid table piece 1 can be device selected from the group consisting of: a pulley-driven hydrostatic bearing rotary table, a grinding equipment, a gear-driven hydrostatic bearing rotary table, a vertical lathe rotary spindle, a hydrostatic bearing rotary table driven by a turbine vortex rod, a horizontal hydrostatic bearing rotary table, or a hydrostatic bearing rotary table driven by a direct drive motor that can be a grinding compound machining center.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A hydraulic hydrostatic pressure rotation module, comprising:
   a table piece, formed with a mount face;
   an oil cavity piece, installed on the mount face, while being formed with at least one first oil cavity, a through hole, at least one second oil cavity, at least one third oil cavity, at least one first oil way, at least one second oil way, at least one third oil way and at least one fourth oil way in a manner that the at least one first oil cavity is disposed on a face of the oil cavity piece that is facing toward mount face, the at least one second oil cavity is disposed on the inner wall of the through hole, the at least one third oil cavity is disposed on a face of the oil cavity piece that is not facing toward the mount face, while allowing the first oil way to be arranged in communication with the first oil cavity, the second oil way to be arranged in communication with the second oil cavity and the first oil way, the third oil way to be arranged in communication with the third oil cavity and the second oil way, and the fourth oil way to be arranged in communication with the second oil way;
   a supporting oil seat, installed on a face of the oil cavity piece that is not facing toward the mount face, being formed with at least one oil entry way in a manner that the oil entry way is disposed in communication with the fourth oil way; and
   a spindle, disposed passing through the supporting oil seat and the through hole of the oil cavity piece while coupling to the table piece;
   wherein the mount face is formed with a labyrinth interface at a position neighboring to the periphery of the mount face.

2. The hydraulic hydrostatic pressure rotation module of claim 1, wherein the mount face has at least one oil return block disposed at the labyrinth interface, and each of the at least one oil return block is formed with an oil way that is arranged in communication with the labyrinth interface; the oil cavity piece is formed with at least one first oil exit way in a manner that each first oil exit way is arranged in communication with the oil way of the at least one oil return block and is formed with at least one oil exit hole.

3. The hydraulic hydrostatic pressure rotation module of claim 2, wherein the oil cavity piece is formed with at least one second oil exit way in a manner that each second oil exit way is arranged in communication with the at least one first oil exit way; the supporting oil seat is formed with at least one ring groove at a face on the supporting oil seat that is facing toward the oil cavity piece and at a position neighboring to the at least one oil entry way while allowing the ring groove to be arranged in communication with the at least one second oil exit way; and the at least one oil entry way is formed with an oil entry hole.

4. The hydraulic hydrostatic pressure rotation module of claim 3, wherein each oil return block is arranged spacing from the inner wall of the labyrinth interface by a specific gap.

5. The hydraulic hydrostatic pressure rotation module of claim 4, wherein the specific gap is ranged between 0.3 mm to 0.6 mm.

6. The hydraulic hydrostatic pressure rotation module of claim 1, wherein the oil cavity piece further comprises:
   at least one restrictor, each arranged at a position between the fourth oil way and the oil entry way; and
   two oil seal rings, arranged at a face of the oil cavity piece that is not facing toward the mount face while allowing the at least one restrictor to be positioned between the two oil seal rings.

7. The hydraulic hydrostatic pressure rotation module of claim 1, wherein the supporting oil seat is formed with a labyrinth interface at a face of the supporting oil seat that is disposed facing toward the oil cavity piece.

8. The hydraulic hydrostatic pressure rotation module of claim 1, wherein one end of the spindle is coupled to a device selected from the group consisting of: a pulley, a direct drive motor module, and an optical ruler unit.

* * * * *